E. NOEL.
UNIVERSAL JOINT.
APPLICATION FILED OCT. 25, 1915.
1,196,268.
Patented Aug. 29, 1916.
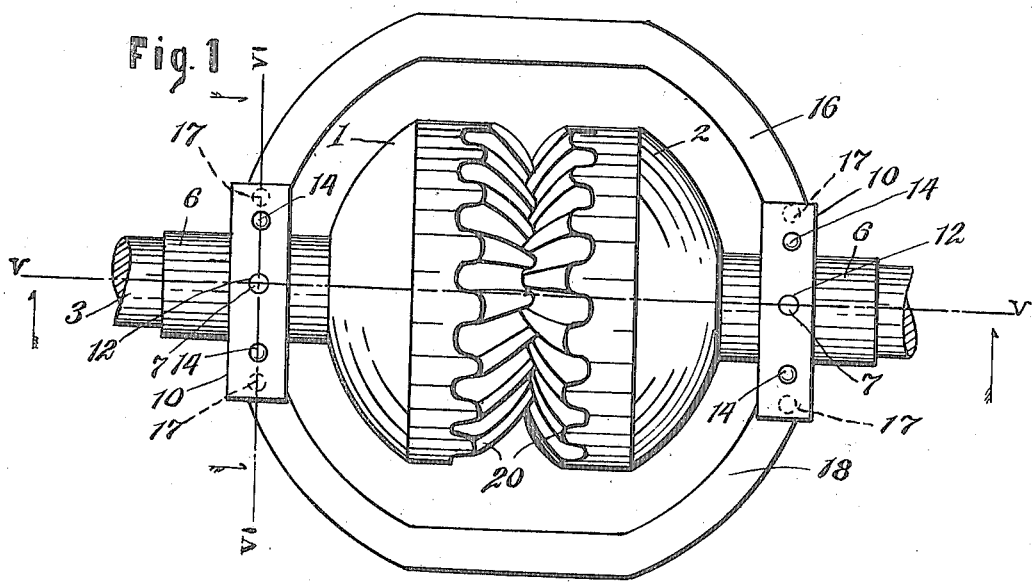
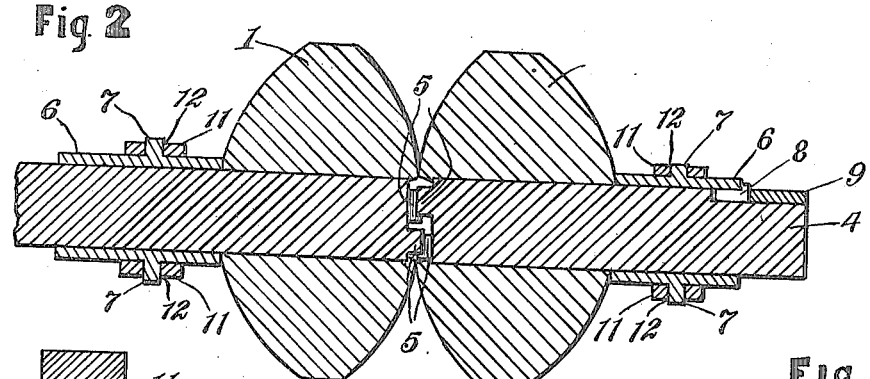
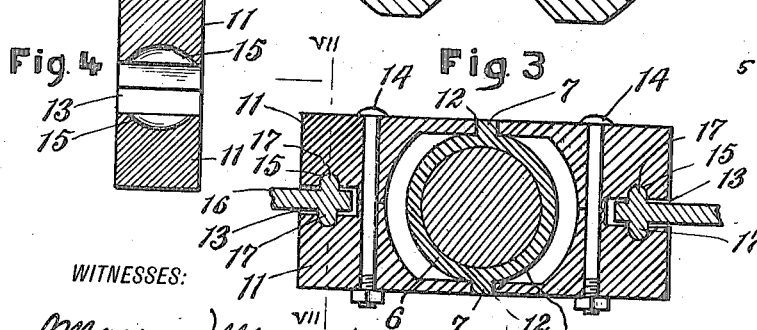
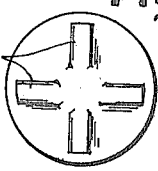
WITNESSES:
INVENTOR
ELI NOEL
BY
M. E. Gillham
ATTORNEY

UNITED STATES PATENT OFFICE.

ELI NOEL, OF KANSAS CITY, MISSOURI.

UNIVERSAL JOINT.

1,196,268.  Specification of Letters Patent.  Patented Aug. 29, 1916.

Application filed October 25, 1915. Serial No. 57,722.

*To all whom it may concern:*

Be it known that I, ELI NOEL, a citizen of the United States, residing at Kansas City, in the county of Jackson and State of Missouri, have invented a new and useful Universal Joint, of which the following is a specification.

My invention relates to improvements in universal joints, and the objects of my improvement are, first, to provide a universal joint having gear wheels with radially extending convex cogs or teeth adapted to mesh and roll at different angles; second, to provide radially extending cogs or teeth on the inner end of the shafts which pierce the gear wheels, so that the same shall coöperate with the gear wheels when the shafts are in straight alinement; third, to provide an equalizing mobile frame for holding the gear wheels in operative adjustment. I attain these objects by the mechanism illustrated in the accompanying drawing, in which—

Figure 1. is a plan view of my invention; Fig. 2. is a longitudinal section of my invention, on the line V, V, in Fig. 1; Fig. 3. is a vertical section through the turn-table, on the line VI, VI, in Fig. 1; Fig. 4. is a cross section through the turn-table on the line VII, VII, in Fig. 3; Fig. 5. is an end view of the inner ends of the shafts, showing the cogs or teeth formed thereon.

Similar reference numerals refer to corresponding parts throughout the drawings.

Referring to the drawings—the numerals 1 and 2, indicate two similarly formed gear wheels mounted respectively on the shafts 3, and 4. The gear wheels 1, and 2, are provided with radially extending convex cogs or teeth 20 which extend inwardly from the peripheral edge of the wheel to adjacent the inner end of the shaft at the axial center of the wheels. Radially extending cogs or teeth are formed on the inner end of the opposing shafts, as shown at 5, in Figs. 2 and 5, and are adapted to engage each other when the shafts are in straight alinement. A sleeve 6, having oppositely disposed pivot pins 7, is mounted on the shafts 3, and 4, and directly abuts the back of the adjacent gear wheel. A key-pin 8, is seated in the shafts and engages the sleeve, as shown at 9, in Fig. 2. A turn-table 10, consisting of two similarly formed bars 11, having each a pivot hole 12, adapted to receive the pivot pins 7, is pivotally mounted on the sleeves 6; the inner central portion of the bars 11, are formed concentrically with the sleeve, so that the turn-table may turn on its pivotal bearings, the limit of said turning movement being determined by the extent of said concentric space between the outer side of the sleeve and the inner side of the turn-table. A portion of the lower side of the end portion of the bars is cut away to form a recess 13, when the bars are operatively assembled and secured together by the bolts 14, which are extended through the bars. A transversely extending slot 15, is formed concave in the lower side of the cut away portion of the bars 11. An outwardly bowed yoke 16, provided at its opposite ends with a spherical pivot 17, formed on its upper and lower sides, is movably mounted and connected between the opposite ends of the opposing turn-tables, the spherical pivots 17, being engaged by the transverse slots 15, in the bars 11. A similar yoke 18, is similarly mounted and is connected between the ends of the opposing turn-tables at the opposite side of the gear wheels. The yokes 16, and 18, combined with the turntables, as described, form a frame adapted to hold the gear wheels in operative adjustment.

Although I have shown and described the gear wheels 3, and 4, as being substantially of equal diameter and provided with cogs or teeth of equal radius and convexity, it is understood that the radius or convexity of the cogs or teeth may be formed dissimilar without departing from my invention or the scope of the appended claims.

The peculiar advantage of my invention is the provision of convex gears held in engagement by a yielding frame which permits the gears to roll on each other, and the further provision of cogs or teeth on the inner end of the respective shafts at the axial center of the gear wheels whereby the shafts coöperate with the gear wheels to receive and impart power when the shafts are in straight alinement. A distinctive advantage is understood to be its adaptability for use in driving portable machines and tools and devices located remote from the line shafting.

To operate my invention, a turning power is applied to one or both of the shafts 3, and 4, in the same direction, when the gear wheels 1, and 2, will revolve. If a turning power be applied to one of the shafts the gear wheel thereon will impart motion and power to the gear wheel on the other shaft. If the shaft 4, is journaled and revolved, the gear wheel 2, will revolve the gear wheel 1, and the shaft 3, regardless whether the shafts are in alinement or at angles to each other, as the gear wheels will roll on each other in all directions outwardly of their centers, because of the convexity of the teeth or cogs. When the shafts 3, and 4, are in straight alinement the cogs or teeth on the inner ends of the shafts are in engagement and, therefore, the shafts are coöperating with the gear wheels in receiving and imparting motion and power. When the gear wheels roll outwardly of their centers, the teeth on the ends of the shafts are disengaged. When the gear wheels are operating outwardly of their centers, a pushing pressure is applied to the one yoke by the turntables and a pulling pressure is applied by the turn-table to the opposite yoke, the turn tables turning on the pivots 7, and the yokes turning on the spherical pivots 17, if the movement of the gear wheels is in horizontal direction, but if the movement of the gear wheels is in vertical direction, the spherical pivots 17, will move to and fro in the concave slot 15. In the movements described, the end portions of the yokes move horizontally or vertically in the recess 13, as the case may be.

Having described my invention what I claim is—

1. In a universal joint, the combination, of oppositely disposed operatively engaged gear wheels having radially extending convex cogs or teeth and provided with individual shafts having cogs or teeth on their inner ends adapted for operative engagement, a sleeve secured on said shafts and provided with oppositely disposed pivot pins, turn-tables pivotally mounted on said sleeves, and pivotally mounted outwardly bowed yokes connected between the ends of said turn-tables and surrounding said gear wheels.

2. In a universal joint, the combination, of oppositely disposed operatively engaged gear wheels having radially extending convex cogs or teeth and provided with individual shafts having cogs or teeth on their inner ends adapted for operative engagement, turn-tables mounted on said shafts, and pivotally mounted outwardly bowed yokes connected between the ends of said turn-tables and surrounding said gear wheels.

ELI NOEL.

Witnesses:
HARVEY E. HARTZ,
MADGE GREENWAY.